Figure 5:
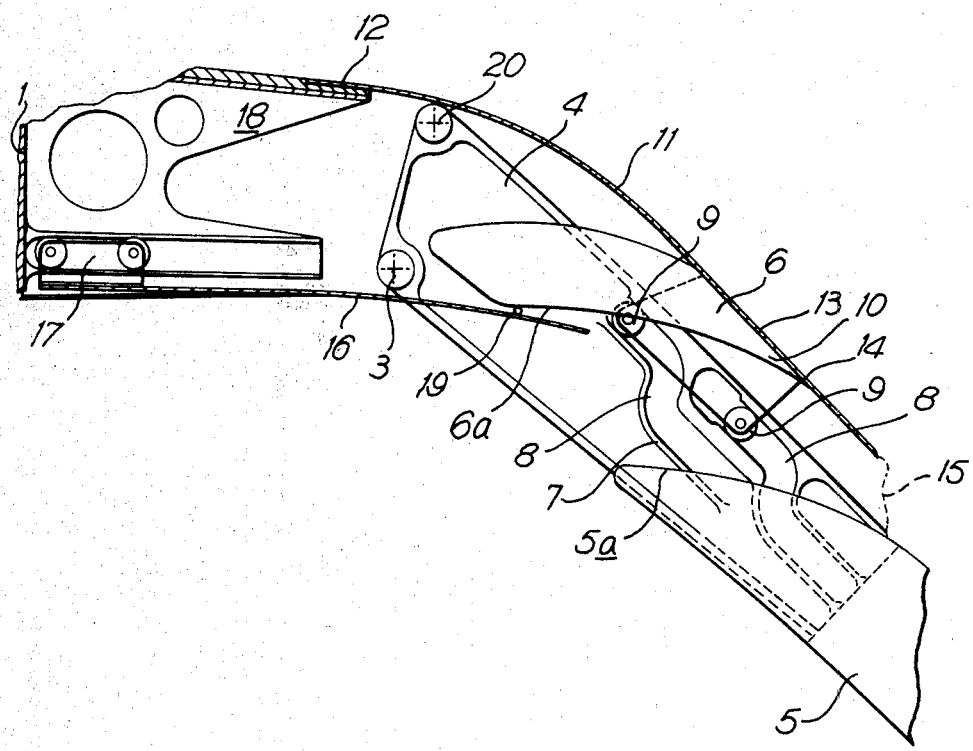

United States Patent [19]

Sharrock

[11] 4,361,299
[45] Nov. 30, 1982

[54] VARIABLE CAMBER WINGS

[75] Inventor: Barry Sharrock, Preston, England

[73] Assignee: British Aerospace Public Limited Company, Weybridge, England

[21] Appl. No.: 197,744

[22] Filed: Oct. 16, 1980

[30] Foreign Application Priority Data

Oct. 19, 1979 [GB] United Kingdom ............... 7936359

[51] Int. Cl.³ .............................................. B64C 9/16
[52] U.S. Cl. .................................... 244/216; 244/219
[58] Field of Search ................... 244/90 B, 201, 212, 244/213, 215, 216, 219, 225

[56] References Cited

U.S. PATENT DOCUMENTS

| 2,920,844 | 1/1960 | Marshall et al. | 244/212 |
| 3,478,987 | 11/1969 | Dorand | 244/212 |
| 3,677,504 | 7/1972 | Schwarzler | 244/212 |
| 4,131,253 | 12/1978 | Zapel | 244/215 |

Primary Examiner—Charles E. Frankfort

Attorney, Agent, or Firm—Cushman, Darby & Cushman

[57] ABSTRACT

A variable camber wing which may act as an aileron and as a slotted flap comprises a leading wing portion 1, a chordwise arm 4 tiltably mounted thereon and carrying a flap element 5, and an intermediate wing portion 6 slidably mounted on the chordwise arm by means of trackways 8 and associated rollers 9. An upper flexible but inextensible skin 11 is anchored to both the leading wing portion 1 and the intermediate wing portion 6. Downward tilting of the arm 4 from a median position causes the upper skin 11 to draw the intermediate wing portion 6 away from the flap element 5. On tilting through small angles, the intermediate wing portion 6 moves chordwise and the skin 11 slides over flap element 5 and defines a smooth and continuous surface between the leading wing portion 1 and the flap element, while on tilting through large angles, the intermediate wing portion moves upwardly relative to the flap element and lifts the skin 11 therefrom.

10 Claims, 5 Drawing Figures

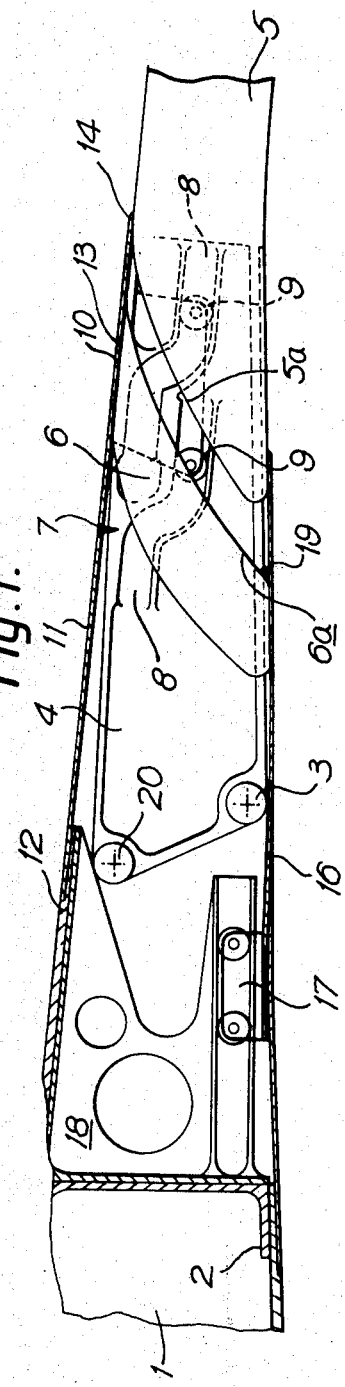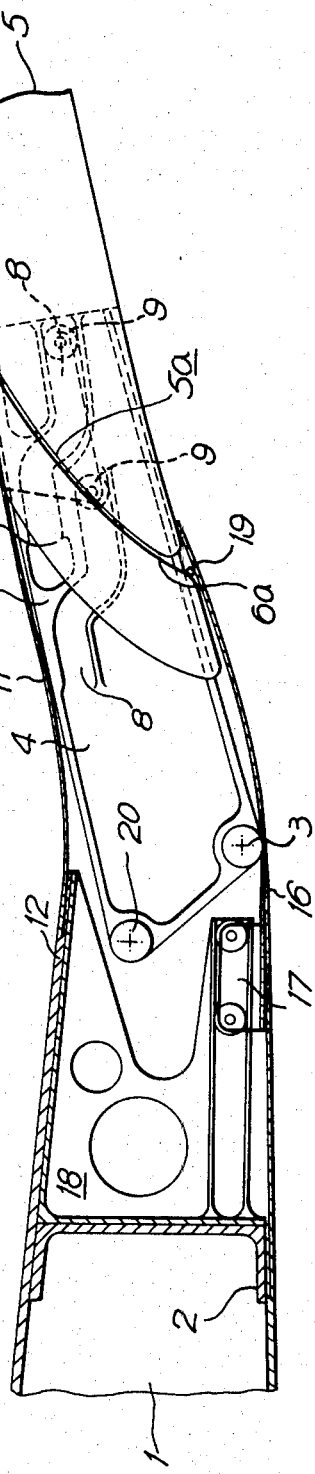

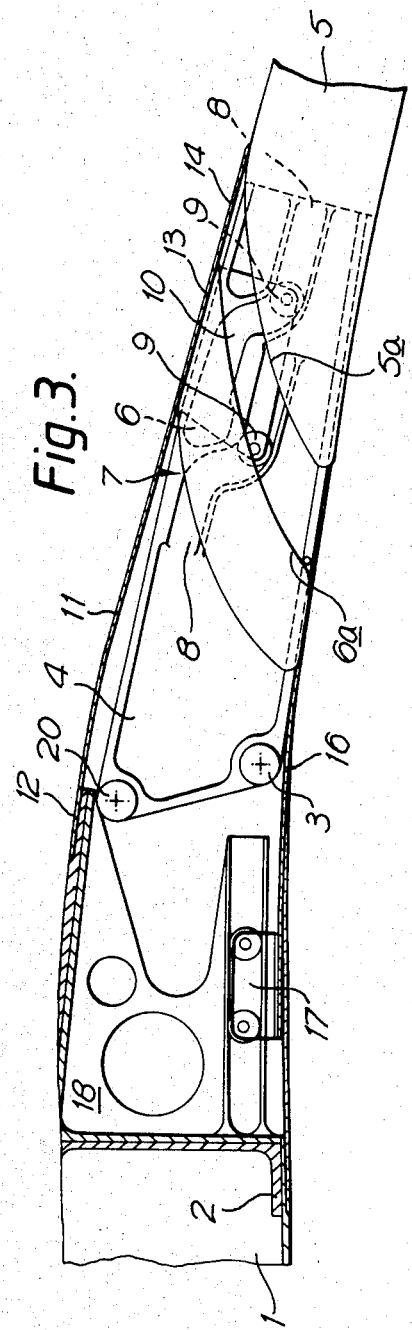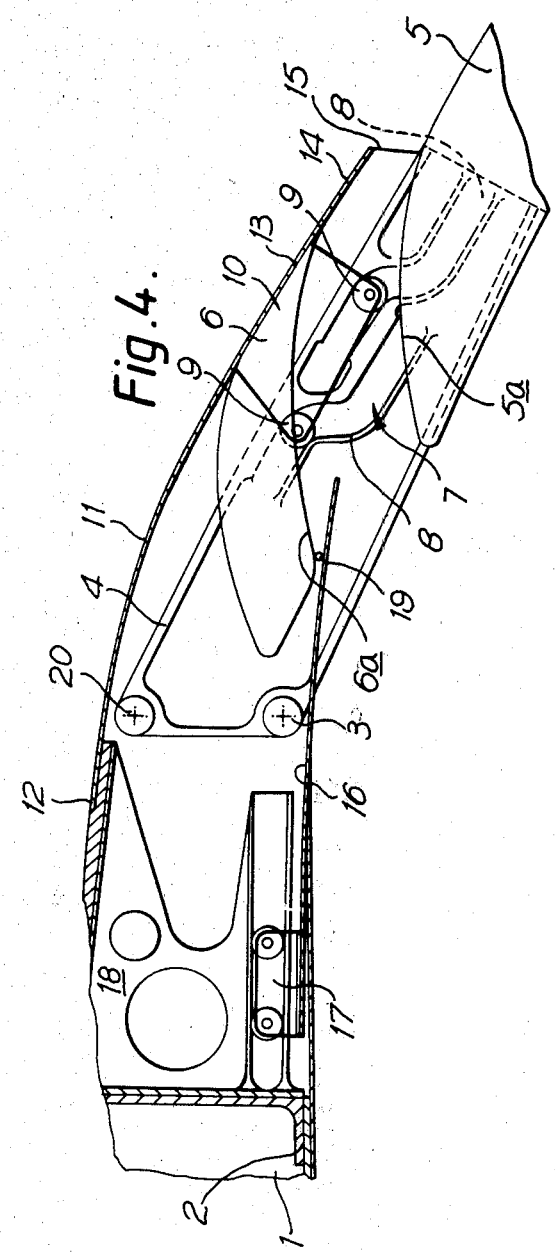

VARIABLE CAMBER WINGS

This invention relates to variable camber wings the camber of which can be varied both for control in roll, as an aileron, and for high lift purposes as a slotted flap.

Variable camber wings are known which comprise a tiltable flap carried by a leading portion of a wing in which arrangement upper and lower flexible skins are attached to the upper and lower surfaces respectively of both the leading portion and the flap. On tilting of the flap the wing is provided with substantially smooth, continuous upper and lower surfaces and the aerodynamic efficiency of the wing is thus improved compared to those forms of wings consisting of solely a fixed portion and a flap member. A modification of this arrangement has been proposed to allow the camber of the wing to be varied both to allow control in roll and also to generate high lift as a slotted flap. In this modification, the upper skin is attached to the trailing region of the leading portion of the wing and engages the leading region of the flap to form a slip joint therebetween when the wing is acting as an aileron. A relatively inflexible shroud is pivotally mounted on the lower surface of the fixed portion which is urged into sealing engagement with the lower surface of the leading region of the flap when the wing is acting as an aileron.

In this modification, when the flap is deflected through relatively large downward angles, it is also moved linearly rearwardly out of engagement with the upper skin and the lower shroud and a slot is thereby formed in the wing. The flap must be supported both for tilting movement and for linear movement, and such supporting means must support greater operative loads than in the case where the flap is supported for tilting movement alone. Similarly, in order to effect the required movements of the flap complex linkages are required to drive the flap. Thus this form of wing suffers from disadvantages in terms of the quantity and cost of the materials required and the relative weight of the wing. Moreover, since the flap has two modes of movement, it is more difficult to prevent flutter or backlash of the flap from reaching unacceptable levels during flight.

It is an object of this invention to provide a variable camber aircraft wing which overcomes at least some of the disadvantages of the above described forms of wing. In this Specification, references to relative attitudes of the various components of a variable camber wing assume the wing to be part of an aircraft in straight and level flight.

According to this invention there is provided a variable camber wing which comprises a leading wing portion, movable flap means carried by and tiltable with respect to the leading wing portion, an intermediate wing portion lying between the leading wing portion and the flap means, and a flexible but substantially inextensible upper skin attached both to the leading portion and the intermediate wing portion which skin includes a trailing portion extending generally rearwardly of the intermediate wing portion, one of the intermediate wing portion and the flap means including a trackway and the other including an associated engaging member received in the trackway for sliding movement, said trackway including spaced upper and lower leading and trailing generally chordwise track portions which are bridged by an intermediate track portion, the arrangement being such that when the flap means is tilted through relatively small angles, the upper skin defines a substantially continuous and smooth surface between the leading wing portion and the flap means whilst when the flap means is tilted downwardly through relatively large angles, the resultant effective foreshortening of the skin causes the intermediate wing portion to be displaced from the flap means in a generally chordwise direction as the engaging member passes along the trackway until the engaging member enters the intermediate portion, whereupon the intermediate wing portion is displaced generally upwardly relative to the flap means and lifts the trailing portion of the skin therefrom.

In order to define a substantially continuous and smooth surface between the leading wing portion and the flap means when the flap means is tilted through relatively small angles, a lower flexible but substantially inextensible skin can be slidably mounted adjacent its leading region on the leading wing portion and pivotably attached adjacent its trailing region to the intermediate wing portion, this skin including a trailing portion extending generally rearwardly of the intermediate wing portion.

A pair of similarly oriented, spaced trackways may be provided, there being an engaging member associated with each trackway, and the or each trackway preferably is provided on the flap means. The upper portion and the lower portion of the or each trackway may be parallel, the or each intermediate track portion advantageously extending forwardly of the associated trailing track portion at an acute angle thereto.

The flap means preferably includes a convexly curved upper leading surface and the intermediate wing portion preferably includes a concavely curved lower trailing surface shaped closely to match the upper leading surface of the flap means. Conveniently the flap means comprises a generally chordwise arm pivotally attached to the leading wing portion which arm carries a flap element at its end remote from its attachment to the leading wire portion.

Preferably, the or each trackway is configured so that generally upward displacement of the intermediate portion relative to the flap means is initiated when the flap means is tilted downwardly from its medium position by an angle of substantially 10° and reaches a maximum when the flap means is tilted downwardly by substantially 25°.

One embodiment of a variable camber wing according to the invention is described with reference to the accompanying drawings in which:

FIG. 1 is a chordwise cross sectional elevation of a rear portion of a variable camber wing in a median position, FIGS. 2 and 3 show the same rear portion of the wing cambered to act as an aileron, that is to say, deformed both upward and downward through relatively small angles, and FIGS. 4 and 5 show the same wing portion cambered and slotted to act as a high lift flap, that is to say, deformed downwards through relatively large angles.

In the Figures, a variable camber wing has a leading wing portion 1 having a spanwise spar 2 and a chordwise bracket (not shown). To a rearward extremity of the bracket is pivoted, about a spanwise axis 3, a chordwise arm 4 which carries a flap element 5 of the wing and also a movable intermediate wing portion 6 lying between the flap element and the leading wing portion.

The flap element 5 is fixedly carried by the arm 4 whilst the intermediate wing portion 6 is located by means 7 which allow relative chordwise movement and also effect change in level with respect to the flap element.

The location means 7 consists of twin chordwise extending trackways 8 formed upon the arm 4. The trackways 8 are similar and each are formed with two levels, one near an upper surface of the wing and one remote therefrom, with a sloping intermediate region between them. A roller 9 engages each trackway and supports a trolley 10 which in turn carries the intermediate wing portion 6.

The flap element 5 forms a trailing edge of the wing; it has a convexly curved upper leading surface 5a.

The intermediate wing portion 6 has a concavely curved lower trailing surface 6a shaped to closely match the surface 5a when in the position of FIG. 2.

To control the chordwise movement of the intermediate wing portion 6, in addition to providing a smooth upper surface contour, a flexible but inextensible upper skin 11 is provided. This is anchored to the leading wing portion 1 at 12 and to the intermediate wing portion 6 at 13. It is formed to adopt both concave and convex curvatures as illustrated respectively in FIG. 2 and in FIGS. 1, 3, 4 and 5. Since the upper skin is inextensible it in effect foreshortens when deformed from the relatively flat configuration of FIG. 1 and, since it additionally is anchored to both the leading wing portion and the intermediate wing portion the latter is drawn towards the former as deformation takes place.

The upper skin 11 has an extension 14 which extends rearwardly beyond the intermediate wing portion 6 to contact an upper region of the flap element 5, as illustrated in FIGS. 1 to 3. As illustrated in FIGS. 4 and 5, it becomes spaced therefrom to form a slot 15 of a width determined by the amount of angular deflection of the arm 4 and the shape of the trackways 8.

A flexible lower skin 16 is provided to smoothly contour the lower surface of the wing in the conditions of FIGS. 1 to 3. This is carried at its forward end by a roller and track arrangement 17, the track extending chordwise on a bracket 18 anchored to the spar 2. The bracket 18 also helps support the upper skin 11. The lower skin 16 is carried at or near a trailing end by the intermediate wing portion 6; attachment is by means of a spanwise hinge 19.

Tilting of the arm 4 is effected by means not shown coupled to the arm 4 at 20. The tilting means can be, for example, a telescopic jack or a geared hinge arrangement.

In operation from the median position of FIG. 1, the chordwise arm 4 can be tilted about the spanwise axis 3 upwards through 15°, as shown in FIG. 2, and downwards through 10°, as shown in FIG. 3 for roll control purposes. That is to say, the rear portion of the wing operates as an aileron. In these conditions, the upper and lower skins 11 and 16 respectively remain in contact with or close to the leading region of the flap element, but deform to provide a variable wing camber effect. It is to be noted that the upper skin 11 holds the intermediate wing portion 6 towards the rear of the trackways 8, so that it lies more or less closely adjacent the flap element 5 depending on whether the arm is tilted upwards or downwards. As can be seen in the median position of FIG. 1 and the downwardly tilted position of FIG. 3, the intermediate wing portion 6 is moved slightly away from the flap element 5 under the influence of the non-extensible upper skin 11 without forming a slot, whilst in the upwardly tilted position of FIG. 2, the intermediate wing portion 6 is urged closely against the flap element.

Further depression of the arm 4 from the position of FIG. 3 to the 25° position of FIG. 4 causes the intermediate wing portion 6 to move further away from the flap element 5, so that the slot 15 is formed. At this stage, the trackways 8 cause the intermediate wing portion 6 to change level with reference to the flap element 5 and thereby widen the slot. This movement also causes the lower skin 16 to move bodily forward on its roller/track arrangement 17 to provide a lower entrance for the slot 15 through which air can flow.

Yet further tilting of the arm 4 to a maximum of 40° brings the rear wing to the configuration of FIG. 5 in which the upper skin 11 has moved the intermediate wing portion 6 to the forward end of the tracks 8 and, simultaneously, the lower skin 16 has moved to the forward end of its roller/track arrangement 17. The configuration and width of the slot 15 is maintained similar to that of FIG. 4.

Although the positions of FIGS. 4 and 5 are described as high lift flap positions, additional (that is to say, aileron) movements may be made from the angular settings of the arm 4 to effect aircraft control in roll simultaneously to providing high lift.

I claim:

1. A variable camber wing which comprises a leading wing portion, movable flap means carried by and tiltable with respect to the leading wing portion, an intermediate wing portion lying between the leading wing portion and the flap means, and a flexible but substantially inextensible upper skin attached both to the leading portion and the intermediate wing portion, which skin includes a trailing portion extending generally rearwardly of the intermediate wing portion, one of the intermediate wing portion and the flap means including a trackway and the other including an associated engaging member received in the trackway for sliding movement, said trackway including spaced upper and lower leading and trailing generally chordwise track portions which are bridged by an intermediate track portion, the arrangement being such that when the flap means is tilted through relatively small angles, the upper skin defines a substantially continuous and smooth surface between the leading wing portion and the flap means, whilst when the flap means is tilted downwardly through relatively large angles, the resultant effective foreshortening of the upper skin causes the intermediate wing portion to be displaced from the flap means in a generally chordwise direction as the engaging member passes along the trackway until the engaging member enters the intermediate portion, whereupon the intermediate wing portion is displaced generally upwardly relative to the flap means and lifts the trailing portion of the skin therefrom.

2. A variable camber wing as recited in claim 1 which includes lower flexible but substantially inextensible skin slidably mounted adjacent its leading region on the leading wing portion and pivotably attached adjacent its trailing region to the intermediate wing portion and including a trailing portion extending generally rearwardly of the intermediate wing portion to define a substantially continuous and smooth surface between the leading wing portion and the flap means when the flap means is tilted through relatively small angles.

3. A variable camber wing as recited in claim 1 wherein a pair of similarly oriented, spaced trackways are provided, there being an engaging member associated with each trackway.

4. A variable camber wing as recited in claim 1 wherein the trackway is provided on the flap means.

5. A variable camber wing as recited in claim 1 wherein the upper portion and the lower portion of the trackway are parallel.

6. A variable camber wing as recited in claim 1 wherein the intermediate track portion extends forwardly of the associated trailing track portion at an acute angle thereto.

7. A variable camber wing as recited in claim 1 wherein the flap means includes a convexly curved upper leading surface and the intermediate wing portion includes a concavely curved lower trailing surface shaped closely to match the upper leading surface of the flap means.

8. A variable camber wing as recited in claim 1 wherein the flap means comprises a generally chordwise arm pivotally attached to the leading wing portion which arm carries a flap element at its end remote from its attachment to the leading wing portion.

9. A variable camber wing as recited in claim 1 wherein generally upward displacement of the intermediate wing portion relative to the flap means is initiated when the flap means is tilted downwardly from its median position by an angle of substantially 10°.

10. A variable camber wing as recited in claim 1 wherein the generally upward displacement of the intermediate wing portion relative to the flap means reaches a maximum when the flap means is tilted downwardly from its median position by an angle of substantially 25°.

* * * * *